US012683302B2

(12) United States Patent
Kropiewnicki

(10) Patent No.: US 12,683,302 B2
(45) Date of Patent: Jul. 14, 2026

(54) ELECTRIC CABLE CONNECTION SYSTEM

(71) Applicant: HARTING Electric Stiftung & Co. KG, Espelkamp (DE)

(72) Inventor: Norbert Kropiewnicki, Bielefeld (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 316 days.

(21) Appl. No.: 18/565,851

(22) PCT Filed: Jun. 23, 2022

(86) PCT No.: PCT/DE2022/100462

§ 371 (c)(1),
(2) Date: Nov. 30, 2023

(87) PCT Pub. No.: WO2023/274451

PCT Pub. Date: Jan. 5, 2023

(65) Prior Publication Data

US 2024/0275082 A1 Aug. 15, 2024

(30) Foreign Application Priority Data

Jul. 2, 2021 (DE) ..................... 10 2021 117 060.5

(51) Int. Cl.
*H01R 4/48* (2006.01)
*H01R 11/28* (2006.01)

(52) U.S. Cl.
CPC ......... *H01R 4/4821* (2023.08); *H01R 4/4833* (2023.08); *H01R 11/28* (2013.01); *H01R 4/48275* (2023.08); *H01R 4/4846* (2023.08)

(58) Field of Classification Search
CPC ............ H01R 4/48185; H01R 4/48275; H01R 4/4821; H01R 4/4833; H01R 4/4846; H01R 11/28
See application file for complete search history.

(56) References Cited

U.S. PATENT DOCUMENTS 4,978,315 A * 12/1990 Edgley ................. H01R 4/4848 439/441
6,851,967 B2 * 2/2005 Miyoshi ............... H01R 4/4833 439/441
7,004,781 B2 * 2/2006 Walter ................. H01R 4/4833 439/441
7,438,587 B2 * 10/2008 Germani .............. H01R 4/4833 439/441
7,607,934 B1 * 10/2009 Yang ........................ H01R 4/22 439/441

(Continued)

FOREIGN PATENT DOCUMENTS

DE 20205821 U1 8/2003
DE 102015108630 A1 12/2016

(Continued)

*Primary Examiner* — Gary F Paumen
(74) *Attorney, Agent, or Firm* — Smartpat PLC

(57) ABSTRACT

In order to make a cable connection system particularly reliable to operate and compact, an actuator (1) is provided with a rib (123) that is located at an end, guides the actuator along sliding edges (243) of the busbar (2, 2') and actuates a clamping leg (33) of a V-shaped clamping spring (3, 3'). This reduces friction and creates space for a collar (613, 613') of the cable (6) at the cable connection end of the rib (123).

15 Claims, 8 Drawing Sheets

(56) References Cited

U.S. PATENT DOCUMENTS

| | | | | |
|---|---|---|---|---|
| 7,762,834 | B2 * | 7/2010 | Schrader | H01R 4/4848<br>439/441 |
| 8,444,443 | B2 * | 5/2013 | Schafmeister | H01R 4/483<br>439/441 |
| 8,579,651 | B2 * | 11/2013 | Hanning | H01R 4/4821<br>439/441 |
| 2004/0102078 | A1 | 5/2004 | Miyoshi et al. | |
| 2017/0012368 | A1 | 1/2017 | Aboulkassem et al. | |
| 2021/0218172 | A1 | 7/2021 | Nehm | |

FOREIGN PATENT DOCUMENTS

| | | | |
|---|---|---|---|
| DE | 102019110175 | A1 | 10/2020 |
| DE | 102020122135 | A1 | 3/2021 |
| EP | 3116065 | B1 | 8/2019 |
| WO | 0213319 | A1 | 2/2002 |
| WO | 2018178164 | A1 | 10/2018 |
| WO | 2019175027 | A1 | 9/2019 |

* cited by examiner

ELECTRIC CABLE CONNECTION SYSTEM

CROSS-REFERENCE TO RELATED APPLICATION

This application is a national stage application, filed under 35 U.S.C. § 371, of International Patent Application PCT/DE2022/100462, filed on Jun. 23, 2022, which claims the benefit of German Patent Application DE 10 2021 117 060.5, filed on Jul. 2, 2021.

TECHNICAL FIELD

The disclosure relates to an electric cable connection system for connecting an electrical cable to an electrical device, for example to an electric plug contact, with little manual effort.

BACKGROUND

In the prior art, "push-in technology" is known for connecting electrical cables to electrical devices. In a specific type of these electric cable connection systems, it is in particular known to insert the electrical cable manually into a cage-shaped busbar. In this case, a substantially V-shaped clamping spring supports itself via the first leg thereof, namely the retaining leg thereof, against a first cage wall of the busbar and, via the second leg thereof, namely the clamping leg thereof, presses a core of the inserted electrical cable against a second cage wall, opposing the first cage wall, so as to establish electrical contact between a core of the cable and the busbar. In this connection process, only the manual introduction of the electrical cable is particularly user friendly.

In this context, it is further known, for example from WO 2018/178164 A1, to use an actuator which makes it possible to detach the electrical cable from the busbar again as needed. By transferring or pressing down the actuator into the release position thereof, the clamping spring is elastically deformed and releases the electrical cable again. In this case, the aforementioned document discloses providing the actuator with a receiving recess in order to receive the clamping spring, with the spring bend thereof, relatively deeply in this receiving recess of the actuator during actuation. In particular, this document discloses a particularly compact design in which the actuator has a cable-receiving cavity which is oriented toward the conductor-receiving chamber and extends in the cable insertion direction, and which reduces the distance between the actuating element and the cable. This produces two slide rails which are located on either side of the receiving cavity, rest against slide edges of the busbar extending in the cable insertion direction and slide along these slide edges when the actuator is actuated.

In addition to the desire for a compact design, one fundamental problem in the construction of systems of this type is moving the actuator back to the initial position thereof in an automatic manner by the simplest possible means after it has been actuated. Depending on other system components, such as the material of the spring, the associated spring tension and the shape of the spring, in particular the shape of the clamping leg thereof, but also the material properties of the actuator and the busbar, the actuator may, on occasion, remain in the actuated position thereof and it may only be possible to return it to the initial position thereof with manual effort, which undesirably limits the ease of use sought.

The search by the German Patent and Trade Mark Office in the priority application for the present application has identified the following prior art:

WO 2018/178164 A1, EP 3 116 065 A1, DE 10 2015 108 630 A1, DE 10 2020 122 135 A1, DE 10 2019 110 175 A1 and DE 202 05 821 U1.

SUMMARY

The object of the disclosure is to specify a design for an electric cable connection system which is as compact as possible and, on the one hand, promotes the automatic movement of the actuator back to the non-actuated position thereof after it has been actuated and, on the other hand, enables the electrical cable to be connected to have the greatest possible cable cross-section relative to the dimensions of the cage-shaped busbar.

The object is achieved by the subject matter of the independent claims.

The electric cable connection system has a cage-shaped busbar, a V-shaped clamping spring, an actuator and an electrical cable which is inserted or is to be inserted into the busbar in a cable insertion direction. The cable comprises an electrically conductive core and has a transmission portion and a contact portion at the end thereof which is to be inserted into the busbar. In the transmission portion thereof, the electrical cable has an electrically insulating sheath which surrounds the core in a radial manner. The contact portion of the cable is used to establish electrical contact with the busbar and therefore does not have an electrically insulating sheath, so the core of the cable is not sheathed in the contact portion. Adjacent to the contact portion, the cable has a collar in the transmission portion thereof. The collar consists of an electrically insulating material and may be formed by an end portion of the sheath. At the end thereof in particular, the cable may have a wire end ferrule which is slid onto the cable end to be inserted and is crimped thereto. In this case, the said collar may be part of the wire end ferrule. In particular, the collar is in this case what is referred to as a "protective collar" of the wire end ferrule.

The cage-shaped busbar has a cage with two cage walls, which in particular oppose each other in a parallel manner, namely a first and a second cage wall, which are coupled to each other by two further walls of the cage, namely two lateral walls. On the cable insertion side, the two lateral walls each have a step, which forms a slide edge extending in the cable insertion direction and a counterstop edge preferably extending at right angles thereto. In this respect, the term "cable insertion side" refers to the side of the busbar from which the cable is inserted into the busbar. The busbar is fully or at least partially open on the cable connection side, i.e., on the cable connection side thereof, to allow the cable to be inserted.

The V-shaped clamping spring has a retaining leg which is fastened to or at least held against the first cage wall. Adjoining the retaining leg thereof, the clamping spring has a spring bend and, adjoining the latter, a resiliently pivotable clamping leg. The clamping leg is used to press the contact portion of the inserted electrical cable against the second cage wall of the busbar in the non-actuated state of the clamping spring, in order to electrically couple the core of the electrical cable to the busbar and simultaneously to secure the cable, by means of clamping, against unintentional withdrawal counter to the cable insertion direction.

The actuator is used to transfer the clamping spring from the aforementioned non-actuated state thereof to an actuated state, wherein the clamping leg in the actuated state is pivoted in the cable insertion direction, while a counterforce is applied by the clamping spring toward the non-actuated state, in order to release the cable again as needed for the purpose of withdrawing it from the cable insertion side.

For this purpose, the actuator has two actuating arms and a web which couples the actuating arms at the ends thereof and is intended for actuating the clamping leg of the clamping spring. The actuating arms may be configured to be substantially planar, preferably extend parallel to the lateral walls of the busbar and particularly preferably lie in a plane therewith. To actuate the actuator, it can be moved manually in the cable insertion direction. In this process, the web of the actuator consequently also moves in the cable insertion direction and simultaneously moves along the clamping leg, which pivots in a resilient manner in the cable insertion direction as a result. Simultaneously, the spring tension which increases during this process acts as a counterforce exerted by the clamping leg on the actuator via the web, at least with a vector component counter to the cable insertion direction.

The web of the actuator is in mechanical contact with the slide edges of the busbar. It preferably extends perpendicularly to the slide edges, so it is able to slide along the slide edges, in particular transversely to its own direction of travel, in order to guide the actuator, in particular in a translational manner.

The use of a web of this type is therefore advantageous, since it considerably reduces the friction between the actuator and the slide rails. This applies in particular to the static friction which arises between the actuator in the actuated state thereof and the slide edges. This is particularly advantageous, since the force required to reset the actuator, after the actuation thereof, from the actuated position to the non-actuated position thereof is thus minimized.

Advantageously, a relatively low level of spring tension may consequently be sufficient to transfer the actuator from the actuated state to the non-actuated state thereof. As a result, the region of mutual mechanical contact between the actuator and the busbar is extremely small, and therefore very little friction and, in particular in the actuated state, very little static friction, arises between these components. This therefore avoids or, in particular depending on the dimensions of the further system components, at least greatly reduces the risk of the actuator remaining in the actuated position thereof and only being movable back to the initial position thereof by manual intervention.

This effect may advantageously be enhanced by providing the web with a rounded shape toward the slide edges. For example, the web may be rounded on the longitudinal edge thereof directed toward the slide edges, either over the entire length thereof or at least in the region of mechanical contact with the slide edges.

In order to maintain the basic orientation thereof, in a preferred configuration the actuator may be received together with the busbar in a contact carrier, in particular in a connection region, on the cable connection side, of the contact carrier. In particular, the actuator may be recessed and received in the contact carrier with a certain amount of clearance (mechanical tolerance) and held therein, wherein no appreciable frictional force arises between the actuator and the contact carrier. It should be noted that the actuator is pressed only via the web thereof against the slide rails of the busbar by the clamping spring, and therefore the friction generated during actuation and return of the actuator substantially, i.e. to a good approximation, arises exclusively at this location.

The actuator may be actuatable through an actuation opening in the contact carrier, for example with a tool, in particular a screwdriver. In addition, the contact carrier may have a connection opening on the cable connection side through which the cable can be inserted into the busbar.

In order to form a plug connector, the contact carrier may have a plug region with a plug side, which in particular opposes the cable connection side of the contact carrier. In addition, a plug contact may be electrically conductively coupled to the busbar, and in particular mechanically fastened thereto, for example to a coupling portion of the busbar. The plug contact itself may be arranged in a contact chamber of the contact carrier, which is open on the plug side, in order to be plugged for example to a further plug contact of a further plug connector, and thus to establish an electrical coupling between the core of the cable and the further plug contact.

The disclosed cable connection system has the advantage that, after the actuator has been actuated, it can be safely and reliably returned in an automatic manner to the non-actuated position thereof by the spring tension of the spring contact.

The disclosed cable connection system has the further advantage that electrical cables with comparatively large cable cross sections may be used, wherein the term "cable cross section" refers to the cross-sectional area of the core of the cable. The term "comparatively" refers to the dimensions of the cage-shaped busbar, more precisely the dimensions of the cage, i.e., the cage walls and lateral walls. In other words, the cage-shaped busbar and in particular the cage thereof can be particularly compact relative to the cable cross sections which can be used.

The disclosed cable connection system has a further advantage with regard to construction. By reducing the said friction, in particular the said static friction, construction-related scope is obtained at other locations in respect of component parameters, for example the thickness, shape and material of the spring contact.

Further advantageous configurations of the cable connection system are laid down in the dependent claims and the following description.

In an advantageous configuration, the actuating arms may have, at the ends thereof, stop edges via which the actuator abuts the counterstop edges of the lateral walls in the actuated state. This is particularly advantageous, since it thus prevents the clamping spring from overextending in an effective and simple manner.

As a result of this stop, which is formed by the stop edges of the actuator and the counterstop edges of the lateral walls, the actuator is disposed in the actuated position thereof, in a precisely defined position. Whereas during the actuation process it is merely necessary to overcome kinetic friction between the actuator and the slide edges of the lateral walls, in the actuated state static friction which is markedly higher than the aforementioned kinetic friction arises between the actuator and the slide edges.

For this reason, using the said web is particularly advantageous for an arrangement of this type. This is because there is also little static friction in an arrangement of this type, since the actuator has only a very small contact surface with the lateral walls due to the web thereof, which extends transversely to the slide edges. Therefore, less spring tension is required to transfer the actuator, after actuation, back to the initial position thereof than would be the case, for example, if instead the actuator had slide rails extending in the cable insertion direction, in which case the large contact surface would inherently result in considerably higher static friction between the actuator and the lateral walls. Advantageously, the use of the web makes it possible on the one hand to achieve greater scope for the wider construction, in particular the dimensions of other components, such as the spring, and/or makes it possible on the other hand to automatically return the actuator, after the actuation thereof, to the non-actuated position in a more reliable manner.

In addition, it is advantageous if the clamping leg of the clamping spring has a protrusion which is in mechanical contact with the web of the actuator in the actuated state, i.e., in particular while the actuator, via the stop edges of the actuating arms thereof, abuts the counterstop edges of the lateral parts. This protrusion makes it possible to increase the restoring spring tension acting on the actuator at the moment when the static friction arises, since, in accordance with the lever principle, a relatively large pivot movement of the clamping leg gives rise to a relatively small movement of the actuator. Ultimately, the force of the spring acting on the actuator counter to the insertion direction increases at the very moment at which the static friction is to be overcome. At the same time, the protrusion reduces the vector component which extends perpendicularly to the insertion direction and presses the actuator, via the web thereof, against the slide rail, thereby reducing the friction, in particular the static friction, at the said moment the actuator reaches a stationary position.

However, the form of the protrusion may be limited in favor of other properties of the spring contact, for example the shape of an adjoining contact region of the spring contact. The reduction in friction, in particular the said static friction, gained by using the web, in particular the rounded web, thus advantageously creates scope in respect of the construction.

It is further particularly advantageous, in respect of the compact nature of this design, if the actuator is configured to be open between the preferably planar actuating arms. This is particularly advantageous since it is consequently possible to insert cables which have relatively large cable cross sections in comparison with the busbar into the busbar and to establish electrical contact with the busbar in the aforementioned manner. In this case, it is clear to a person skilled in the art that the term "cable cross section" refers to the cross-sectional area of the core of the electrical cable, as the core is essential for electrical characteristics.

Preferably, the web forms a projection, or at least part of a projection, on the actuator in the direction of the slide edges. This is advantageous to prevent further regions of the actuator, in particular the lateral parts thereof, from coming into contact with the busbar, in particular the slide edges thereof, in order thus to ensure the said low frictional resistance between the actuator and the busbar. In addition, this also further contributes to the compact design, since it creates space for the collar of the cable.

This is because the collar of the cable terminates on the cable insertion side of the web, in particular in both the actuated and non-actuated states of the actuator, and thus obviously also during the actuation process. This is particularly advantageous since it is consequently still possible to use electrical cables with comparatively large cable cross sections, even in the case of a compact design and with the aforementioned reduction in static friction achieved through the use of the said web.

In particular, the collar may moreover dip between the two actuating arms, at least in certain regions, which allows the design to be even more compact relative to the cable cross section.

Usually, as already mentioned, the collar is the protective collar of a wire end ferrule. If a cable without a wire end ferrule is used, the collar may also be the sheath of the cable.

In practice, the contact portion of the cable is usually what is referred to as a "stripped" region of the cable.

It is known to a person skilled in the art to initially cut a cable with an insulating sheath ("insulation") to the desired length and subsequently to remove the sheath in the end portion, the technical term for which is "stripping", thereby producing the said contact portion at the cable end to be inserted.

In addition, it is known to a person skilled in the art to optionally provide the cable, at the stripped end thereof, with a wire end ferrule, and in particular to crimp it, wherein the wire end ferrule is provided in particular with a protective collar.

If the cable has a wire end ferrule, the protective collar thereof may form the collar of the aforementioned arrangement. In the case of cables which do not have a wire end ferrule, the collar may be formed by the end portion of the insulating sheath.

In a further advantageous configuration, the first cage wall of the cage-shaped busbar has a cage opening and/or is ideally even fully replaced by a cage opening. This has the advantage that the cage-shaped busbar is open toward the retaining leg of the clamping spring, so the retaining leg can be pivoted in a resilient manner at least slightly out of the cage of the cage-shaped busbar via the region of the first cage wall/through the cage opening. Busbars of this type are referred to here and further below as "open". The cage of the cage-shaped busbar is thus formed by at least three, in particular four, cage walls, namely the two lateral walls, the second cage wall and, where applicable, the first cage wall.

Owing to the cage opening, however, it may in this case no longer be possible for the clamping spring to support itself, or support itself sufficiently, via the retaining leg thereof against the first cage wall.

In this case, it may be necessary to additionally or alternatively hold, or even fasten, the retaining leg against the busbar, in particular against the cage from the exterior, preferably against the first cage wall from the exterior, for example by pressing, clamping, stamping, riveting, screwing, clamping, adhesively bonding and/or latching.

In principle, the busbar may be formed in one piece from a single metallic material, for example by die casting or by milling from a solid.

Alternatively, the busbar may also be formed from a plurality of different, in particular metallic, materials such as zinc alloys and/or copper alloys and/or aluminum alloys and/or one or more identical or different sheet metals such as stainless steel sheet.

Several of the aforementioned features/feature combinations can be summarized in a highly simplified manner as follows:

In order to configure the cable connection system to be particularly reliable to operate and simultaneously compact, the actuator is provided with the web at the end thereof. The web guides the actuator on slide edges of the busbar and actuates the clamping leg of the V-shaped clamping spring. This both reduces the friction, in particular the static friction, between the actuator and the busbar in the actuated state and also creates space for the collar of the cable on the cable connection side of the web. This is because the collar of the cable is arranged on the cable connection side of the web and can moreover dip between the two actuating arms, particularly preferably into a receiving opening extending into the projection.

BRIEF DESCRIPTION OF THE DRAWINGS

An exemplary embodiment of the invention is described in greater detail below and is shown in the drawings, in which.

DETAILED DESCRIPTION

Figure 1A:
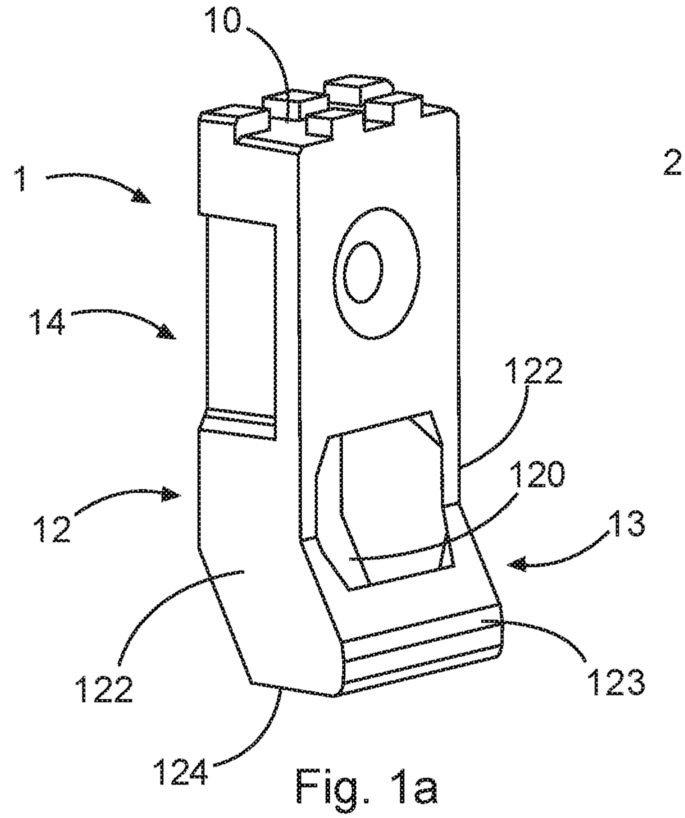
FIG. 1*a* shows an actuator.

The figures contain schematic illustrations which have been simplified in some cases. In some cases, identical reference signs are used for like elements which may, however, not be identical. Different views of like elements may be scaled differently.

The figures show a cable connection system and the actuation thereof. The cable connection system has an actuator 1, a cage-shaped busbar 2, 2' with a cable connection side 26, a V-shaped clamping spring 3 and a cable 6, which comprises a collar 613, 613', is to be inserted into the busbar 2, 2' through the cable connection side 26 in the insertion direction and is to be electrically coupled to the busbar 2 by means of the clamping spring 3 and thus connected thereto. Also shown is a plug contact 5, which is electrically and mechanically coupled to the busbar 2, 2' at a coupling portion 25, and a contact carrier 4 which receives the aforementioned arrangement.

In the drawings, the cable connection side 26 is, in principle, shown at the top. The cable insertion direction extends from top to bottom in the drawings.

FIG. 1*a* shows the actuator 1. The actuator 1 has a substantially cuboid-shaped retaining portion 14, with which it can be held in the contact carrier 4. At the cable connection end (shown at the top in the drawing), the actuator 1 has a driving surface 10, for example for applying a tool, for example a slotted screwdriver. The driving surface 10 has a structure which facilitates the application of the slotted screwdriver.

Adjacent to the retaining portion 14 on the plug side, the actuator 1 has an actuating portion 12 for cooperating with the cage-shaped busbar 2 shown below and the clamping spring 3 described in greater detail below. The actuating portion 12 has two mutually opposing actuating arms 122, which are coupled to each other at the ends thereof by a web 123. The web 123 forms at least part of a projection 13. The actuating arms 122 are configured to be planar. A through-opening, namely a receiving opening 120, remains between the actuating arms 122. In the proximity of the web 123 (at the bottom of the drawing), a portion of this receiving opening 120 continues into the projection 13. Adjacent to the web 123, the actuating arms 122 each have a stop edge 124 which terminates flush with the web 123 in the cable insertion direction, i.e., from top to bottom in the drawing.

Figure 1B:
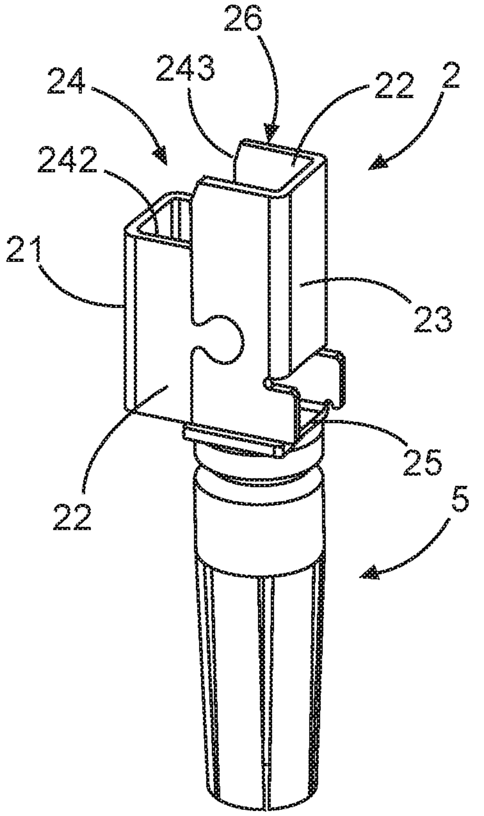
FIG. 1*b* shows a cage-shaped busbar with a plug contact.

FIG. 1*b* shows a cage-shaped busbar 2 with a plug contact 5 which is fastened and electrically conductively coupled to the former. In the embodiment shown here, the busbar 2 is a punched-bent part. In the production thereof, the latter can therefore for example be punched from a metal sheet and bent into the desired shape. In other embodiments, the cage-shaped busbar 2 could also be produced in a zinc die-casting process or by milling "from a solid", i.e., from a solid material, or the like.

In the embodiment shown here, the busbar 2 has a cage with two cage walls 21, 23 which oppose each other in a parallel manner, namely a first cage wall 21 and a second cage wall 23, which are coupled to each other by two further walls of the cage, namely two lateral walls 22. The embodiment shown here makes it possible for the clamping spring 3 to support itself against the first cage wall 21 from the interior while pressing against the second cage wall 23 via the clamping leg 33 thereof. As soon as an electrical conductor, for example a core 60 of an electrical cable 6 shown further below, is introduced into the busbar 2 between the second cage wall 23 and the second clamping leg 33 of the clamping spring in the cable insertion direction, this electrical conductor is by the clamping spring by means of the clamping leg On the cable insertion side, the two lateral walls 23 each have a step 24, which in each case forms a slide edge 243 extending in the cable insertion direction and a counterstop edge 242 preferably extending at right angles thereto. The busbar 2 has a coupling portion 25 on the plug side for coupling to the plug contact 5.

Figure 1C:
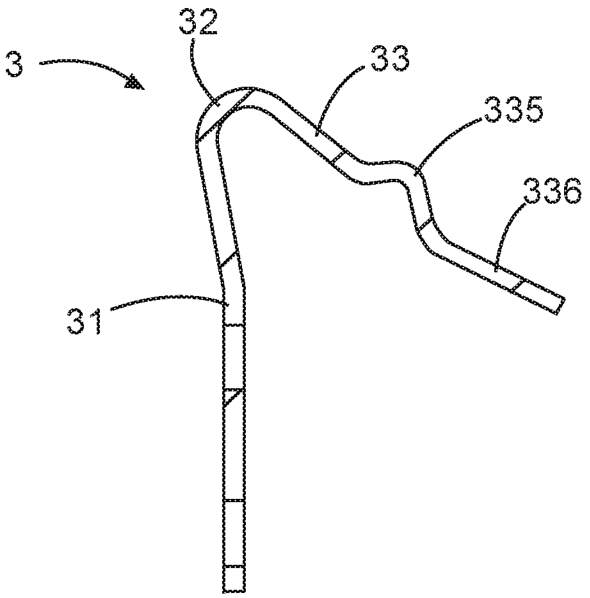
FIGS. 1*c*, *d* show a V-shaped clamping spring.
Figure 1D:
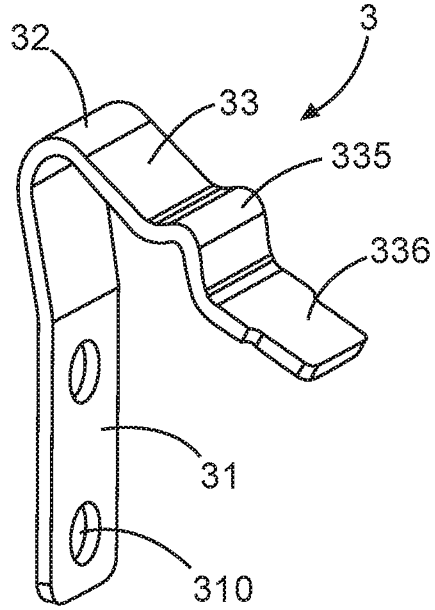
Figure 2A:
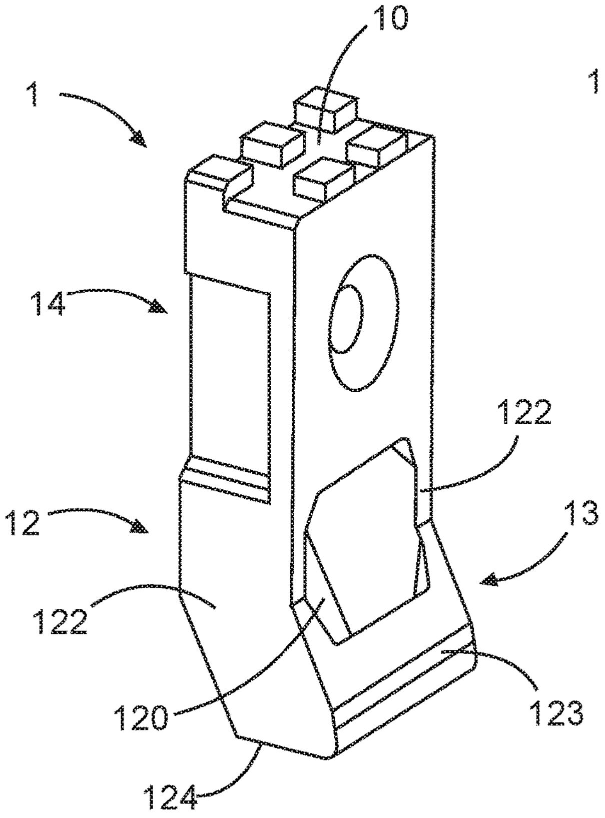
FIGS. 2*a*-*d* show different views of the actuator.
Figure 2B:
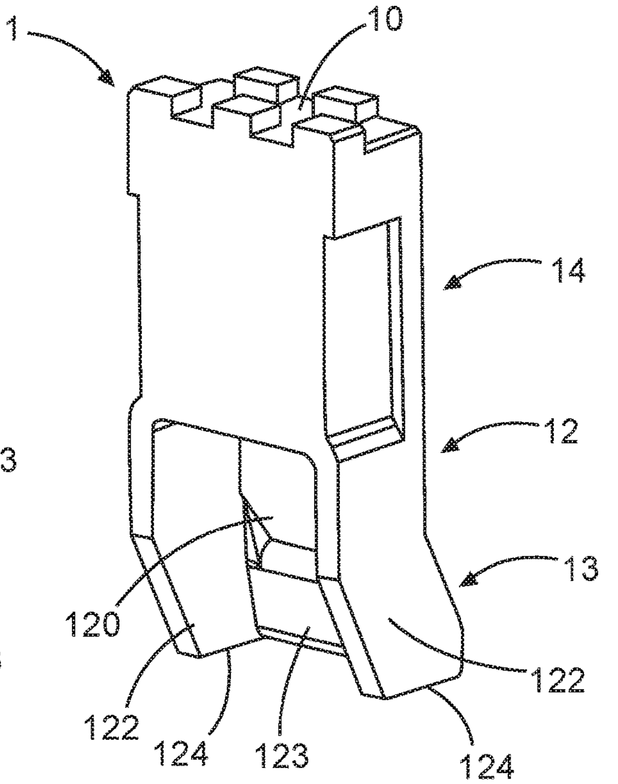
Figure 2C:
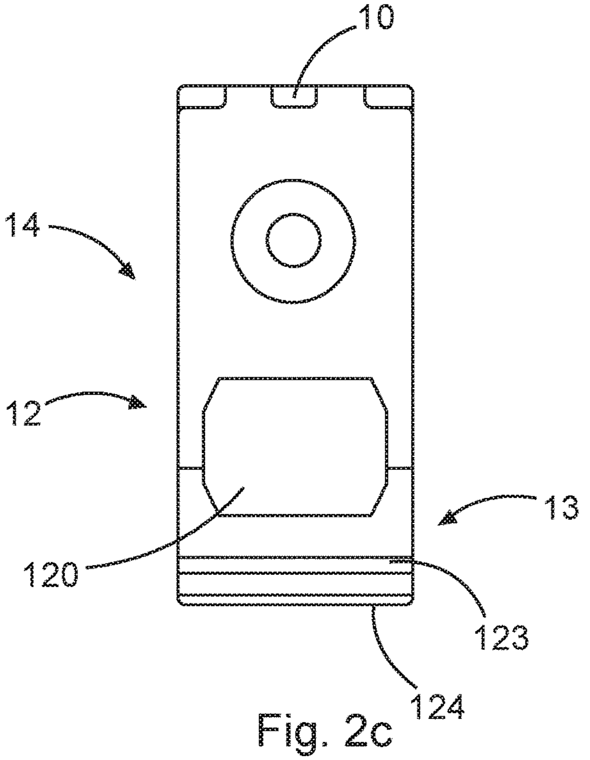
Figure 2D:
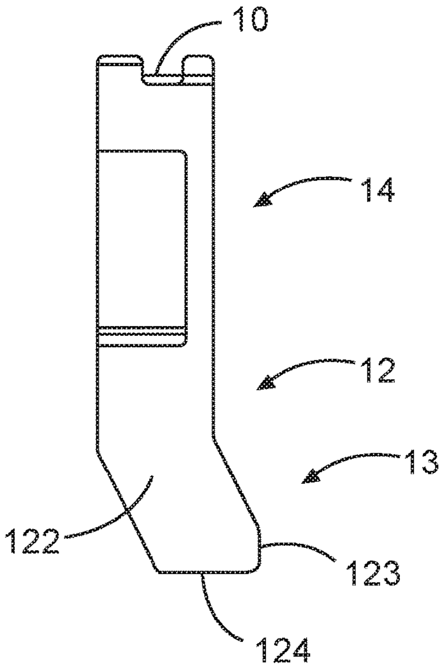

FIGS. 1*c* and 1*d* show a side view and an oblique plan view of a clamping spring 3. The clamping spring 3 is configured to be substantially V-shaped. It has a retaining leg 31 and a clamping leg 33, which are coupled to each other via a spring bend 32. It is clear from FIG. 1*d* that retaining means, or more precisely retaining openings, are arranged in the retaining leg 31. The former are used to hold or even fasten the clamping spring against the first cage wall 21.

At the spring bend 32, the spring is bent by more than 270°, so the two legs 31, 33 form an acute angle to each other. The clamping leg 33 has a protrusion 335 and a contact region 336 adjoining the latter.

FIGS. 2*a*-*d* show the actuator 1 again in different views, namely an oblique plan view, an oblique rear view, a front view and a side view. It is evident in particular from the side view shown in FIG. 2*d* that the web 123 is merely part of a projection 13, since the receiving opening 120 extends into the projection 13. In another embodiment, however, the web 123 could also form the entire projection 13.

Figure 3:
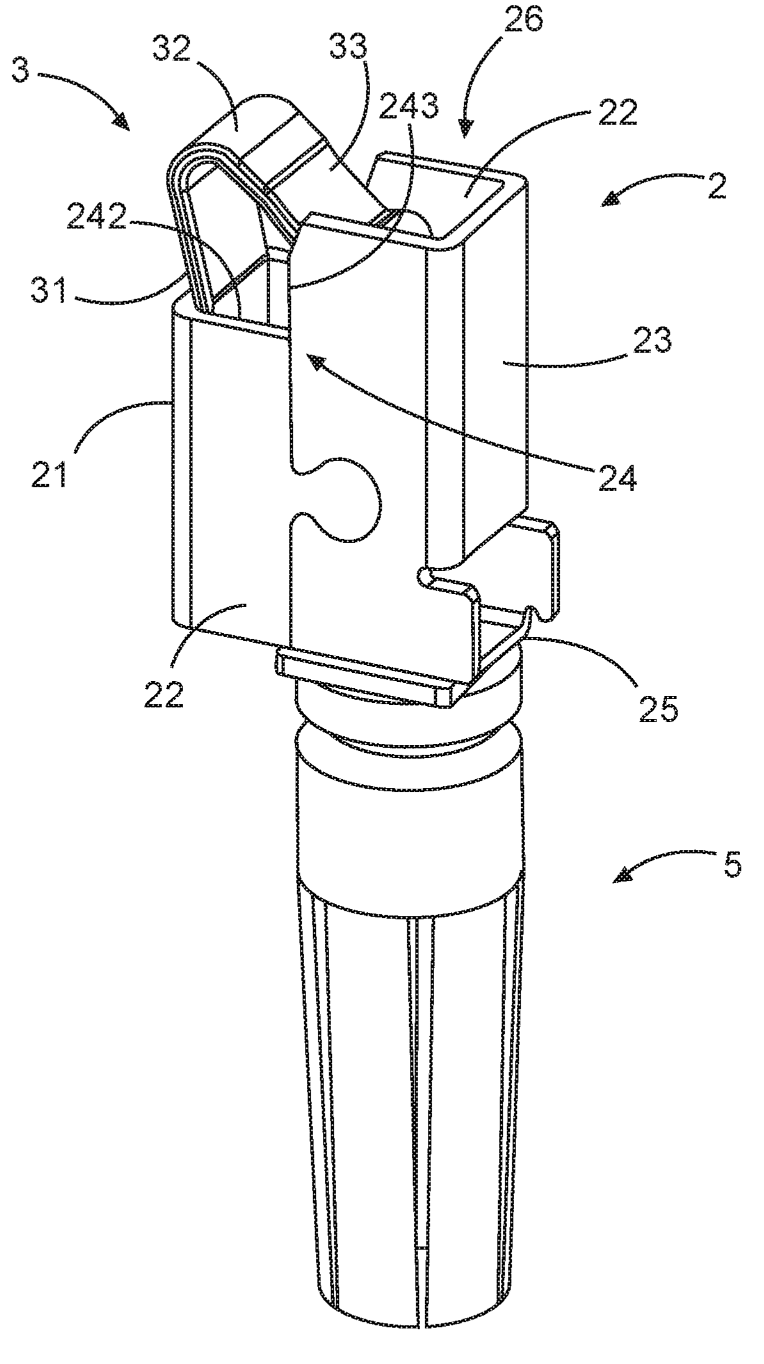
FIG. 3 shows the busbar with the clamping spring.

FIG. 3 shows the cage-shaped busbar 2 with the V-shaped clamping spring 3 held therein. The clamping spring 3 supports itself, via the retaining leg 31 thereof, against the first cage wall 21 from the interior, and simultaneously presses, via the clamping leg 33 thereof, against the second cage wall 23 from the interior. Via the retaining openings 310 of the retaining leg 31 thereof, the clamping spring 3 can be held against the first cage wall 21 from the interior, for example by inwardly directed stamping regions in the first cage wall 21, which prevent the clamping spring from being displaced in or counter to the cable insertion direction.

In addition, the busbar 2 has a coupling portion 25, via which a plug contact 5 is electrically conductively coupled and mechanically fastened to the busbar 2. The plug contact 5 and the busbar 2 may be manufactured from different electrically conductive materials.

Figure 4A:
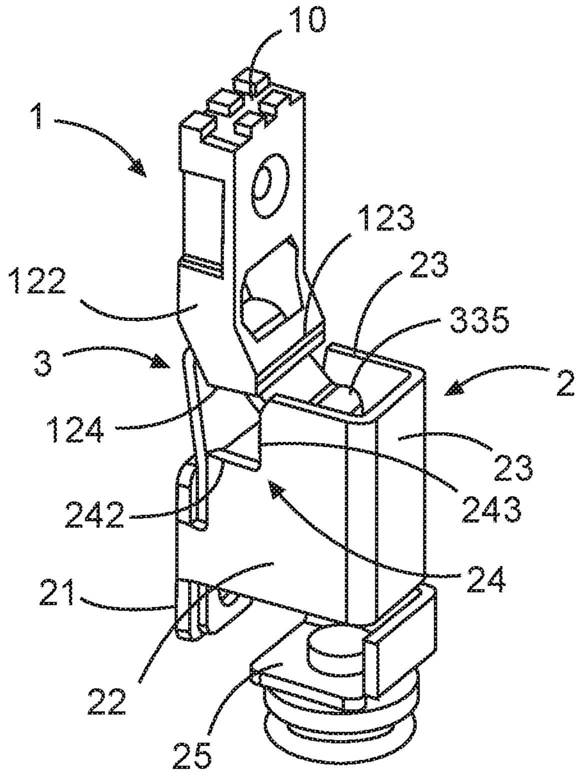
FIGS. 4*a*-*d* show different views of an actuation process.
Figure 4B:
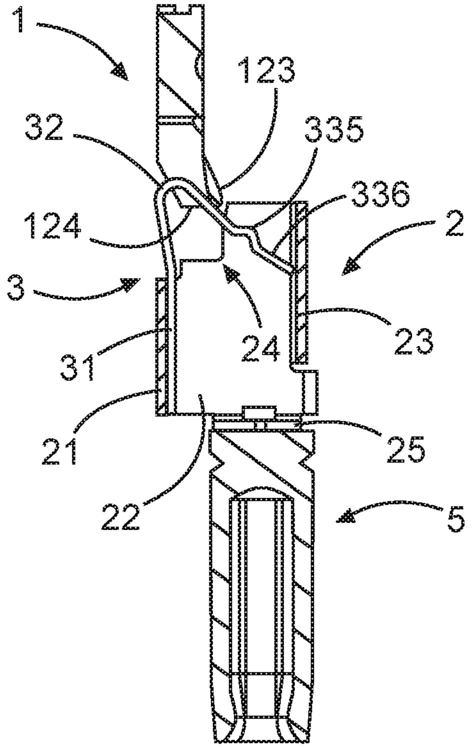
Figure 4C:
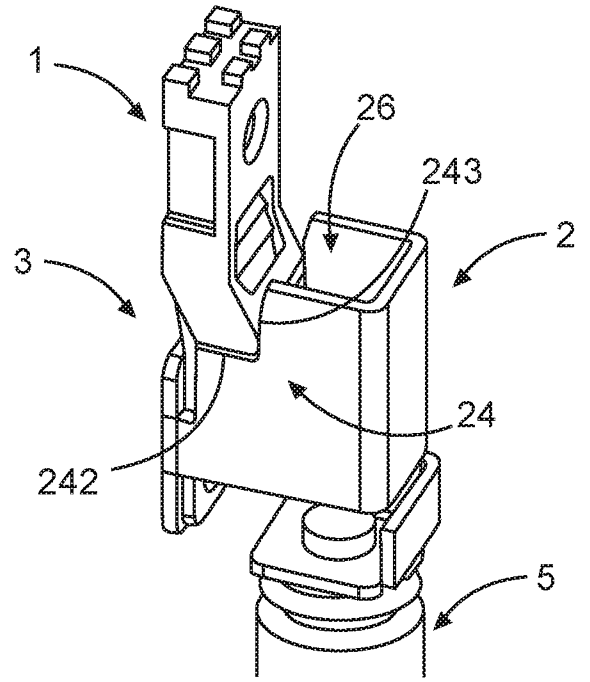
Figure 4D:
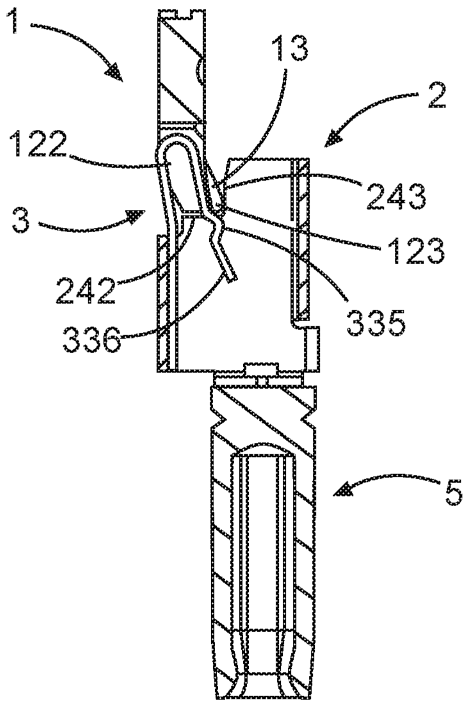

FIGS. 4*a* and 4*b* show three-dimensional and sectional views of the busbar 2 with the clamping spring 3 and the actuator 1 in a non-actuated state. FIGS. 4*c* and 4*d* show the actuator 1 and the clamping spring 3 in an actuated state.

The lateral walls 22 of the busbar 2 each have the said step 24 with the slide edge 243 and the counterstop edge 242.

From these illustrations it is clear to see that, during actuation of the actuator 1, in which the latter is displaced in the cable insertion direction, i.e., from top to bottom in the drawing, it slides via the web 123 thereof along the slide edges 243 of the busbar 2 until it strikes, via the stop edges 124 thereof, the counterstop edges 242 of the busbar 2, as shown in FIGS. 4*c* and 4*d*. In particular, FIG. 1*d* further shows that at the moment a stationary position is reached, when the kinetic friction between the actuator 1 and the busbar 2 has transitioned to static friction, the web 123 of the actuator 1 is in mechanical contact with the protrusion 335 of the clamping leg 33 of the clamping spring 3. In this case, as a result of the said actuation, the clamping leg 33 is pivoted in the cable insertion direction, compared to the position thereof shown in FIG. 4*b*.

As a result of the mechanical contact between the web 123 and the protrusion 335, the actuator 1 is pressed by the clamping spring 3 more strongly in the direction of the cable connection side 26 and, perpendicularly thereto, correspondingly less strongly against the slide edge 243. It is particularly advantageous that this vectorial change in the direction of the action of force takes place at the very moment at which the particularly high static friction to be overcome arises. The vector component causing the said friction, in particular the said static friction, is reduced in the actuated position by the protrusion 335. In return, the vector component which acts counter to the cable insertion direction and exerts a restoring force on the actuator increases. As a result, it is therefore possible for the static friction to be somewhat further reduced, and the force component overcoming the former to be increased in the direction of travel of the actuator 1.

However, since this aforementioned effect by the said protrusion 335 is also limited, it is further particularly advantageous to minimize the static friction arising between the actuator 1 and the busbar 2, namely the web 123 and the slide edges 243, by other/additional measures. This static friction may be further reduced by minimizing the contact surface between the web 123 of the actuator 1 and the slide edges 243 of the busbar 2. It is firstly therefore already very advantageous that the web 123 extends perpendicularly to the slide edges 243. In addition, it is further advantageous if the web 123 has a rounded shape toward the slide edges 243.

Figure 5A:
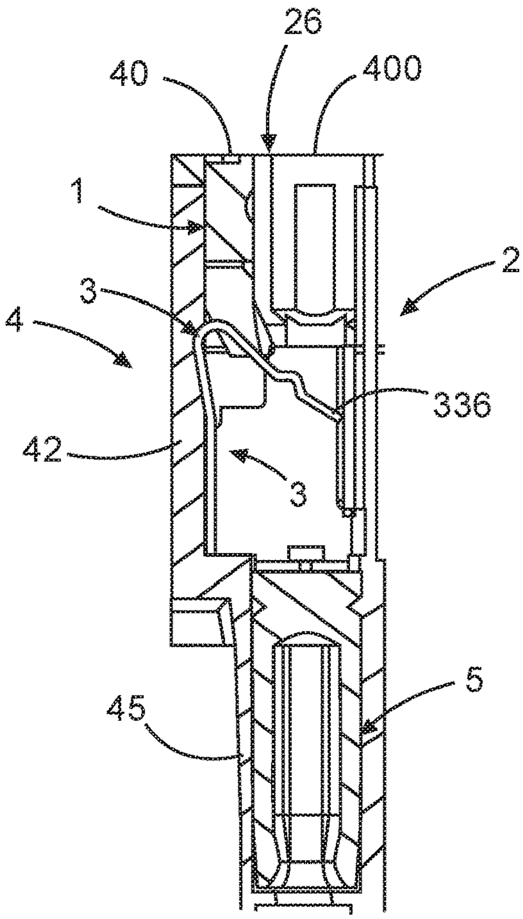
FIGS. 5*a*, *b* show the actuation process, with the contact carrier illustrated.
Figure 5B:
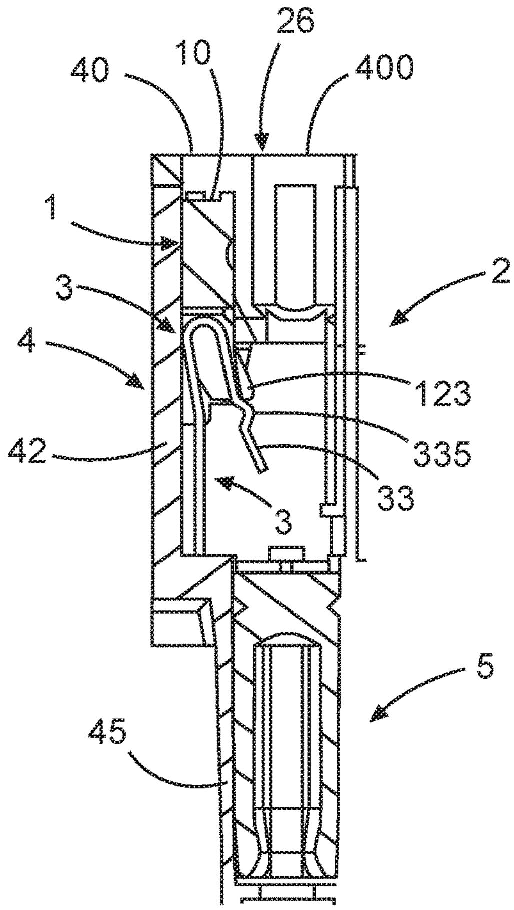
FIG. 5*c* shows a cable.
FIG. 5*d* shows a wire end ferrule of the cable.

FIGS. 5*a* and 5*b* show a comparable arrangement and a comparable process, wherein it is also shown that the actuator 1 and the busbar 2, and consequently also the clamping spring 3 and the plug contact 5, are received in a contact carrier 4 and held therein.

For this purpose, the contact carrier has a connection region 42 for receiving the busbar 2, the clamping spring 3 and the actuator 1, and a plug region 45, which is open on the plug side (at the bottom in the drawing), for receiving the plug contact 5 and for plugging this plug contact 5 in, for example, a mating plug connector.

The actuator 1 is in this case arranged in a recessed manner in an actuation opening 40 of the contact carrier 4 and can be actuated through this actuation opening 40 on the cable connection side, i.e., from the direction of the cable connection side 26, for example with a slotted screwdriver. During the actuation process, the actuator 1 may be guided by means of the contact carrier 4. However, a considerable proportion of the frictional resistance arises between the actuator 1 and the busbar 2, against which the actuator 1 is pressed by the clamping spring.

In addition, the contact carrier 4 has a connection opening 400, through which a cable 6 for establishing contact with the busbar 2 can be inserted into the busbar 2 in the cable connection direction, i.e., from top to bottom in the drawing.

Figure 5C:
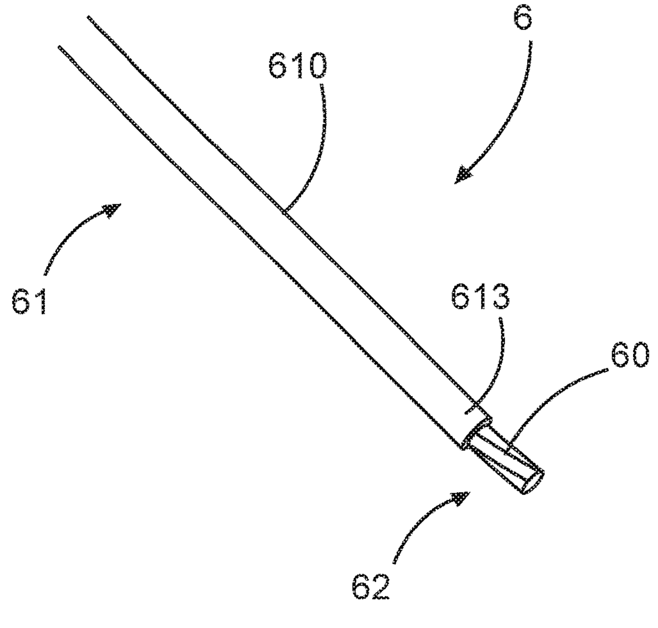
Figure 5D:
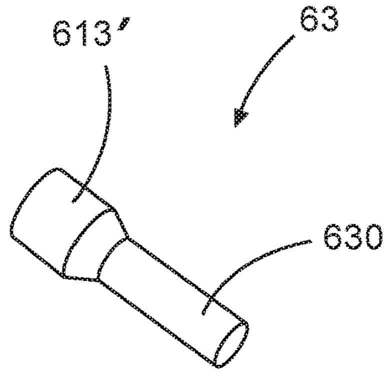

FIG. 5*c* shows an electrical cable 6 and FIG. 5*d* shows an associated wire end ferrule 63. The cable 6 comprises an electrically conductive core 60 and has a transmission portion 61 and a contact portion 62 at the end thereof to be inserted into the busbar 2. In the transmission portion 61 thereof, the electrical cable 6 has an electrically insulating sheath 610 which surrounds the core 60 in a radial manner. The contact portion 62 of the cable 6 is used to establish electrical contact with the busbar 2 and therefore does not have an electrically insulating sheath 610, so the core 60 of the cable 6 is not sheathed in the contact portion 62. Adjacent to the contact portion 62, the cable 6 has a collar 613, 613' in the transmission portion 61 thereof. The collar 613, 613' consists of an electrically insulating material. In an embodiment, the collar 613 is formed by an end portion of the sheath 610. Alternatively, in another embodiment, the cable may have, at the end thereof, the wire end ferrule 63, which is slid onto the cable end to be inserted and crimped thereto via the crimping region 630 thereof. In this case, the said collar 613' may be part of the wire end ferrule 63. In particular, the collar 613' is in this case what is referred to as a "protective collar" of the wire end ferrule 63.

Figure 6A:
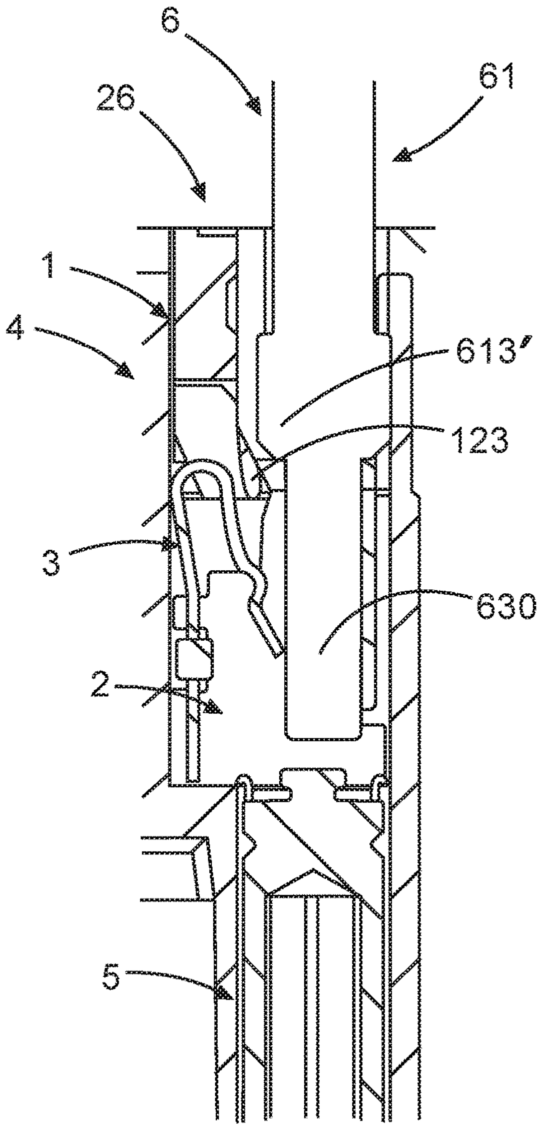
FIGS. 6*a*, *b* show the actuation of a cable connection system.
Figure 6B:
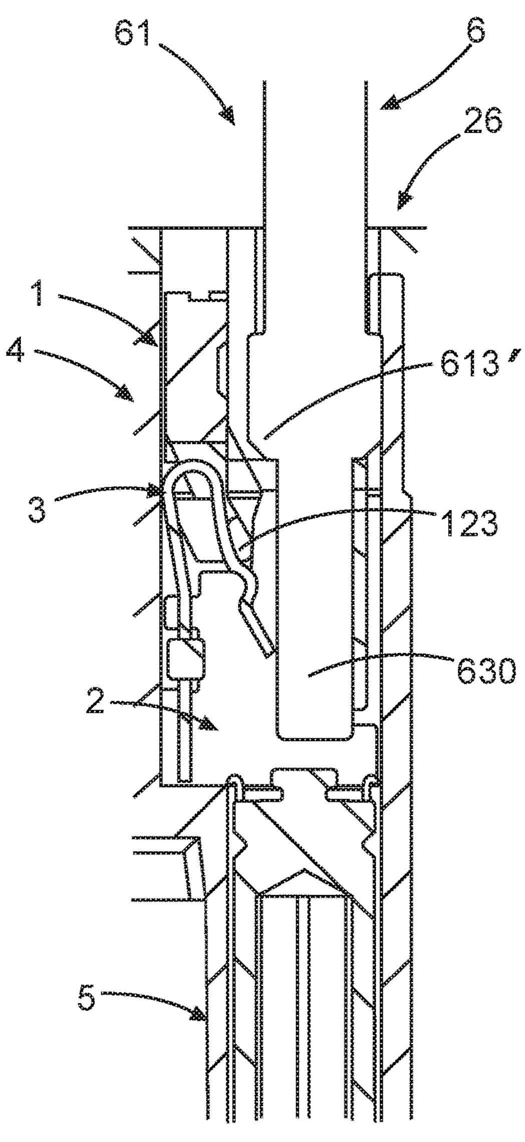

FIG. 6*a* shows a cable connection system, having the actuator 1, the cage-shaped busbar 2, the V-shaped clamping spring 3 and the cable 6, wherein the actuator 1 is disposed in the non-actuated position thereof. FIG. 6*b* shows the same arrangement in the actuated state.

FIGS. 6*a* and 6*b* further show how the cable 6, with the collar 613' and the stripped and crimped contact portion 62 thereof, which is thus surrounded by the crimping region 630 of the wire end ferrule 63, is arranged in the busbar 2.

In both the actuated and non-actuated states, the collar 613' of the cable 6 is arranged on the cable connection side, i.e., above the web 123 of the actuator 1 in the drawing.

This achieves a particularly compact design for the cable connection system. This effect is further enhanced by the receiving opening 120 of the actuator 1, since the receiving opening 120 is able to partially receive particularly large collars 316, 316' belonging to cables 6 with cores 60 having a relatively large cross-section, thereby creating additional space, i.e., in other words, further improving the compact nature of the design of the cable connection system in relation to the size of the cable cross sections of the cables 6 to be received.

Forming the web 123 to be at least part of the projection 13 also assists in minimizing the frictional resistance and in particular the static frictional resistance of the actuator 1 against the busbar 2, as already described in detail.

FIGS. 7*a-d* and 8*a-d* show further embodiments of busbars 2' which may likewise be part of the cable connection system. Although they differ from each other, the open busbars are denoted with the reference sign 2' below for reasons of clarity. In the examples shown here, the busbar 2' may be formed in one piece from a metallic material, for example by die casting or by milling from a solid.

In principle, the busbars 2, 2' shown here in the exemplary embodiment may be formed both from a single material and from a plurality of different, in particular metallic, materials such as zinc alloys and/or copper alloys and/or aluminum alloys and/or sheet metal.

In these embodiments, the first cage wall 21 of the cage-shaped busbar 2' has a cage opening 20. This has the advantage that the busbar/cage of the busbar 2' is open toward the retaining leg 31 of the clamping spring 3, so the clamping spring 3 can, via the retaining leg 31 thereof, be resiliently pivoted at least slightly out of the cage of the busbar 2'. The busbars 2' shown in these illustrations are therefore referred to as "open cage-shaped busbars" 2'.

In open cage-shaped busbars 2' of this type, the retaining leg 31 of the clamping spring 3 is fastened to the busbar 2' from the exterior, for example by pressing, stamping, riveting, screwing, clamping, adhesively bonding and/or latching and/or a similar fastening method.

Figure 7A:
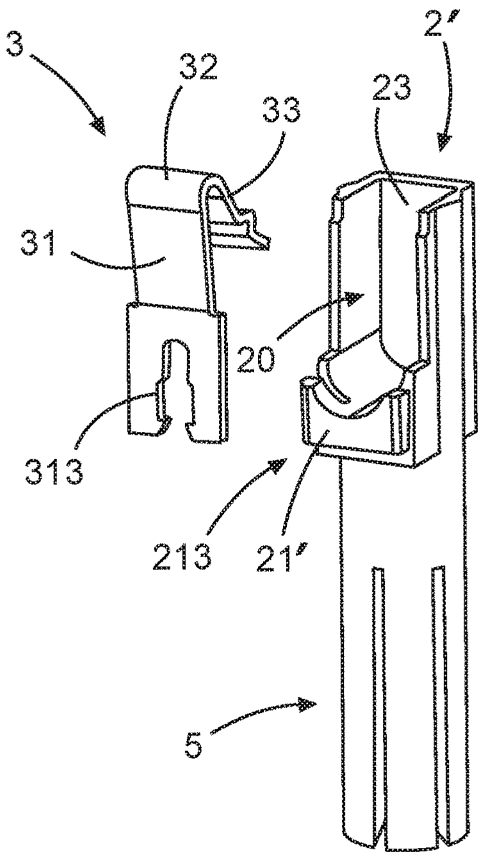
FIGS. 7*a*, *b* show a first open busbar with a first clamping spring latched/to be latched thereon.
Figure 7B:
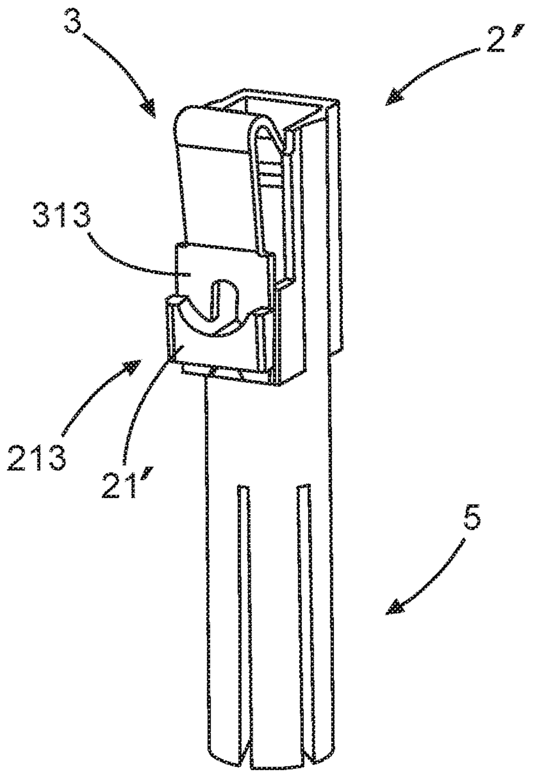
FIGS. 7*c*, *d* show a second open busbar with a second clamping spring latched/to be latched thereon.

FIGS. 7*a* and 7*b* show a first open cage-shaped busbar 2' which has a cage latch 213 and in which at least a part 21 of the cage latch 213 can be interpreted as part of the first cage wall 21' which has the said cage opening 20 above the cage latch 213. A first further clamping spring 3' appropriate therefor also has, on the clamping leg 31 thereof, an additional retaining latch 313 corresponding to the cage latch 213. This latch is particularly stable.

Figure 7C:
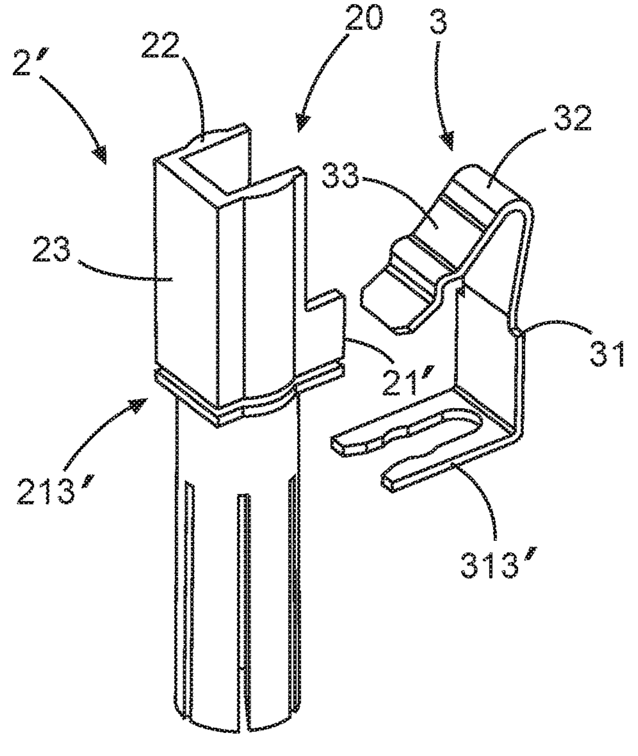
Figure 7D:
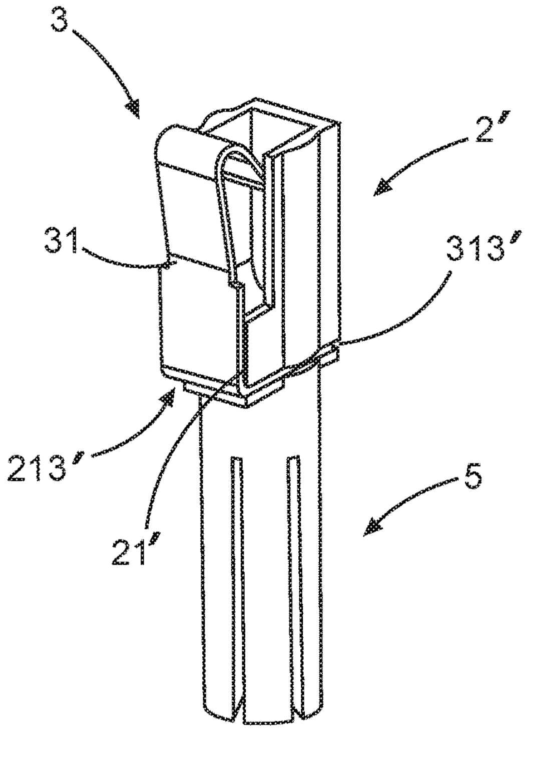

FIGS. 7*c* and 7*d* show a second open cage-shaped busbar 2' in which the cage latch 231' and the retaining latch 313' extend perpendicularly to the cable insertion direction, in contrast to the arrangement shown above. A second further clamping spring 3' appropriate therefor is consequently held via the retaining leg 31 thereof against the first cage wall 21', from the exterior on this occasion.

Figure 8A:
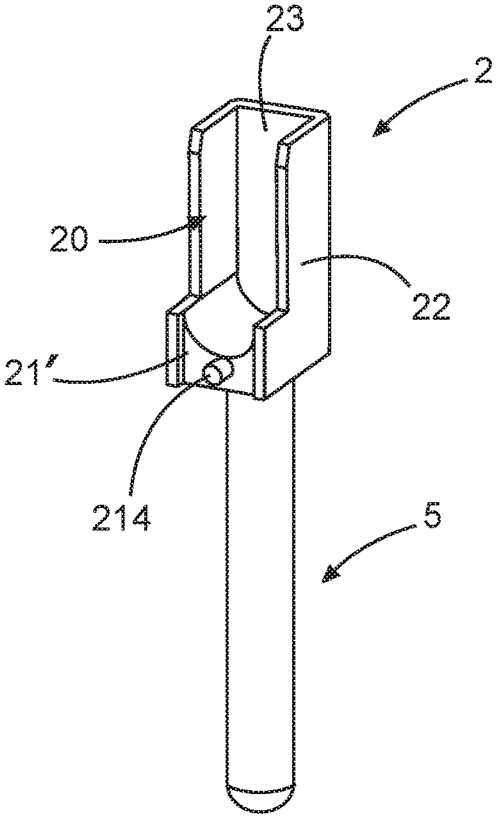
FIGS. 8*a*, *b* show a third open busbar with and without a third clamping spring to be fastened thereto.
Figure 8B:
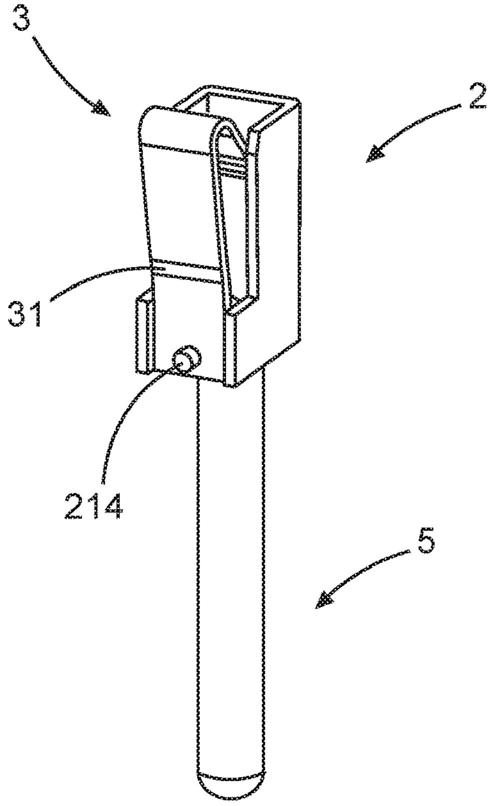
FIGS. 8*c*, *d* show a fourth open busbar with and without a fourth clamping spring to be fastened thereto.

FIGS. 8*a* and 8*b* show a third open cage-shaped busbar 2', to which a third further clamping spring 3' is fastened by stamping the retaining leg 31 thereof by means of a retaining opening 310 (not denoted here for reasons of clarity) arranged in the retaining leg 31 and a retaining stamping region 214 which is still cylindrical at this point and is subsequently stamped. The third further clamping spring 3' is in this case also subsequently fastened via the retaining leg 31 thereof to the first cage wall 21', albeit from the exterior.

Figure 8C:
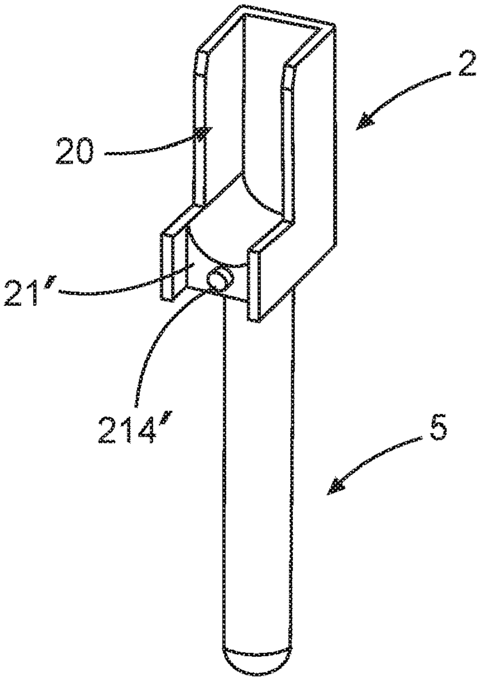
Figure 8D:
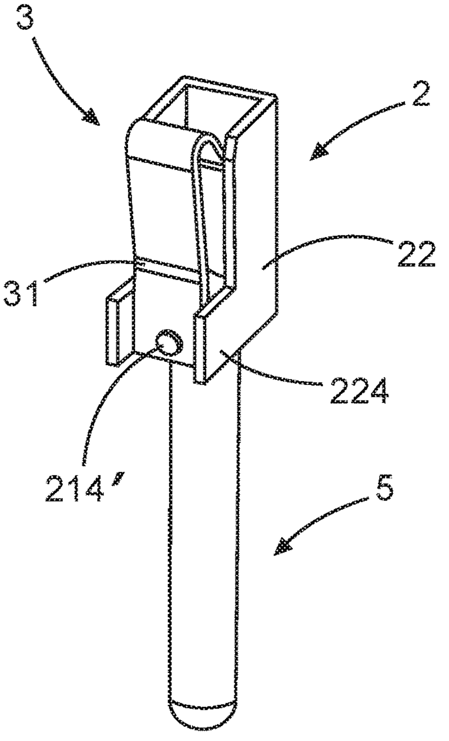

In contrast, FIGS. 8*c* and 8*d* show a fourth open cage-shaped busbar 2', in which a fourth clamping spring 3' appropriate therefor is similarly positioned, via the retaining leg 31 thereof and the retaining opening 310 (not denoted here) located therein, on a retaining pin 214' in FIG. 8*d*, but this retaining pin 214' is not stamped. Instead, the two lateral walls 22 of the cage-shaped busbar 2 are elongated in the fastening region of the retaining leg 31 of the fourth clamping spring 3' and, depending on the material properties of the busbar, can be more or less easily bent to fix the fourth clamping spring 3' via the retaining leg 31 thereof. Following this bending process, the fourth clamping spring 3' is also fastened via the retaining leg 31 thereof to the first cage wall 21' of the fourth busbar 2' from the exterior.

Even though different aspects or features of the invention are each shown in combination in the figures, it is apparent to a person skilled in the art, unless otherwise indicated, that the combinations shown and discussed are not the only possible combinations. In particular, corresponding units or combinations of features from different exemplary embodiments can be exchanged with one another.

LIST OF REFERENCE SIGNS

1 actuator
10 driving surface
12 actuating portion
120 receiving opening
122 actuating arms
123 web
124 stop edge
13 projection
14 retaining portion
2 cage-shaped busbar
2' open cage-shaped busbars
20 cage opening
21, 21' first cage wall
213, 213' cage latch
214 cage stamping portion
214' retaining pin
224 clamping tabs
22 lateral walls
23 second cage wall
24 step
242 counterstop edge
243 slide edge
25 coupling portion
26 coupling side
3 clamping spring
3' further (first, second, third, fourth) clamping springs retaining leg 31
310 retaining opening
313 retaining latch
32 spring bend
33 clamping leg
335 protrusion
336 contact portion
4 contact carrier
40 actuation opening
400 connection opening
42 connection region
45 plug region
5 plug contact
6 cable
60 core
61 transmission portion
610 sheath
613, 613' collar, protective collar
62 contact portion
63 wire end ferrule
630 crimping region

The invention claimed is:

1. An electric cable connection system, comprising:

a cage-shaped busbar (2, 2') which is fully or at least partially open on a cable connection side to allow an electrical cable (6) to be inserted, including
 a cage which has two cage walls, namely a first cage wall (21, 21') and a second cage wall (23), and
 two lateral walls (22) which couple the first cage wall (21, 21') and the second cage wall (23) to each other, wherein the two lateral walls (22)
  each have a step (24) on a cable insertion side, wherein the step (24)
   is formed by a slide edge (243) extending in a cable insertion direction and a counter stop edge (242);

a V-shaped clamping spring (3, 3'), including
 a retaining leg (31), the retaining leg (31) being fastened to the first cage wall (21, 21') of the busbar (2, 2') by engagement of a leg retaining feature (310) with a corresponding wall retaining feature,
 a spring bend (32) adjoining the retaining leg (31) and, adjoining thereto,
 a resiliently pivotable clamping leg (33), which can assume a non-actuated state in which it presses a contact portion (62) of the electrical cable (6) against the second cage wall (23) of the busbar (2, 2') in the non-actuated state of the clamping spring (3, 3'), in order to electrically couple a core (60) of the electrical cable (6) to the busbar (2, 2') and simultaneously to secure the cable (6) against unintentional withdrawal counter to the cable insertion direction; and which further can assume an actuated state in which it is pivoted, while applying a counterforce, in the cable insertion direction in order to release the cable (6) again as needed for withdrawing it from the cable insertion side;

an actuator (1) for transferring the clamping spring (3, 3') from the non-actuated state thereof to an actuated state, wherein the actuator (1) includes two lateral actuating arms (12) and a web (123) which couples the actuating arms (12) via ends thereof and is configured for actuating the clamping leg (33) of the clamping spring (3, 3'), wherein the web (123) extends perpendicularly to the slide edges (243) of the lateral walls (22) of the busbar (2, 2') and is in mechanical contact with the slide edges (243), so it is able to slide along the slide edges (243) in order to guide the actuator (1); and the electrical cable (6), which includes the electrically conductive core (60), a transmission portion (61) comprising an electrically insulating sheath (610) which surrounds the core (60) in a radial manner, and the contact portion (62), which is located at an end of the cable (6) to be inserted into the busbar (2, 2') and in which the cable (6) for establishing electrical contact with the busbar (2, 2') does not have an electrically insulating sheath (610), so the core (60) of the cable (6) is not sheathed in this contact portion (62), and a collar (613, 613') which is adjacent to the contact portion (62) and consists of an electrically insulating material;

wherein the collar (613, 613') of the electrical cable (6) is arranged on the cable insertion side of the web (123) of the actuator (1).

2. The electric cable connection system as claimed in claim 1, wherein the collar (613) of the cable is formed by an end region of the sheath (610).

3. The electric cable connection system as claimed in claim 1, wherein the cable has, at the end thereof, a wire end ferrule (63), and wherein the collar (613') of the cable (6) is formed by a protective collar of the wire end ferrule (63).

4. The electric cable connection system as claimed in claim 1, wherein the counter stop edge (242) of the step (24) of the lateral walls (22) extends in each case at right angles to the slide edges (243) thereof.

5. The electric cable connection system as claimed in claim 1, wherein the two lateral actuating arms (122) are configured to be substantially planar and extend parallel to the lateral walls (22) of the busbar (2, 2').

6. The electric cable connection system as claimed in claim 1, wherein the web (123) of the actuator (1) extends at right angles to the slide edges (243) of the lateral walls (22) of the busbar (2, 2').

7. The electric cable connection system as claimed in claim 1, wherein the web (123) has a rounded shape toward the slide edges (243).

8. The electric cable connection system as claimed in claim 1, wherein the actuating arms (122) each have, at the ends thereof, a stop edge (124) with which they abut the respective counter stop edge (242) of a respective one of the two lateral walls (22) in the actuated state of the actuator (1).

9. The electric cable connection system as claimed in claim 1, wherein the web (123) forms at least a part of a projection (13) on the actuator (1) towards the slide edges (243).

10. The electric cable connection system as claimed in claim 1, wherein the collar (613, 613') of the cable (6), at least in the non-actuated state of the actuator (1), dips between the two lateral actuating arms (122) at least in certain regions into a receiving opening (120) of the actuator (1).

11. The electric cable connection system as claimed in claim 1, wherein the clamping leg (33) has a protrusion (335) which, in the actuated state of the actuator (1), is in mechanical contact with the web (123) thereof.

12. The electric cable connection system as claimed in claim 1, wherein the busbar (2, 2') has a coupling portion (25) which is adapted to mechanically fix a plug contact (5) to the busbar (2, 2') and electrically couple the plug contact (5) to the busbar (2, 2').

13. The electric cable connection system as claimed in claim 1, wherein the first cage wall (21) and the second cage wall (22) oppose each other in a parallel manner, and wherein the clamping spring (3) supports itself, via the retaining leg (31) thereof, against the first cage wall (21) from an interior thereof.

14. The electric cable connection system as claimed in claim 1, wherein a driving surface (10) of the actuator (1) is arranged above the collar (613, 613') of the electrical cable (6) when the resiliently pivotable clamping leg (33) is in the actuated state.

15. An electric cable connection system, comprising:

a cage-shaped busbar (2, 2') which is fully or at least partially open on a cable connection side to allow an electrical cable (6) to be inserted, including a cage which has two cage walls, namely a first cage wall (21, 21') and a second cage wall (23), and two lateral walls (22) which couple the first cage wall (21, 21') and the second cage wall (23) to each other, wherein the two lateral walls (22)

each have a step (24) on a cable insertion side, wherein the step (24)

is formed by a slide edge (243) extending in a cable insertion direction and a counter stop edge (242);

a V-shaped clamping spring (3, 3'), including a retaining leg (31) which is fastened to, or at least held against, the first cage wall (21, 21') of the busbar (2, 2'), a spring bend (32) adjoining the retaining leg (31) and, adjoining thereto, a resiliently pivotable clamping leg (33), which can assume a non-actuated state in which it presses a contact portion (62) of the electrical cable (6) against the second cage wall (23) of the busbar (2, 2') in the non-actuated state of the clamping spring (3, 3'), in order to electrically couple a core (60) of the electrical cable (6) to the busbar (2, 2') and simultaneously to secure the cable (6) against unintentional withdrawal counter to the cable insertion direction; and which further can assume an actuated state in which it is pivoted, while applying a counterforce, in the cable insertion direction in order to release the cable (6) again as needed for withdrawing it from the cable insertion side;

an actuator (1) for transferring the clamping spring (3, 3') from the non-actuated state thereof to an actuated state, wherein the actuator (1) includes two lateral actuating arms (12) and a web (123) which couples the actuating arms (12) via ends thereof and is configured for actuating the clamping leg (33) of the clamping spring (3, 3'), wherein the web (123) extends perpendicularly to the slide edges (243) of the lateral walls (22) of the busbar (2, 2') and is in mechanical contact with the slide edges (243), so it is able to slide along the slide edges (243) in order to guide the actuator (1); and the electrical cable (6), which includes the electrically conductive core (60), a transmission portion (61) comprising an electrically insulating sheath (610) which surrounds the core (60) in a radial manner, and the contact portion (62), which is located at an end of the cable (6) to be inserted into the busbar (2, 2') and in which the cable (6) for establishing electrical contact with the busbar (2, 2') does not have an electrically insulating sheath (610), so the core (60) of the cable (6) is not sheathed in this contact portion (62), and a collar (613, 613') which is adjacent to the contact portion (62) and consists of an electrically insulating material;

wherein the collar (613, 613') of the electrical cable (6) is arranged on the cable insertion side of the web (123) of the actuator (1), and wherein the first cage wall (21') of the cage-shaped busbar (2') has a cage opening (20) or is even fully replaced by an opening (20) of this type, so the cage-shaped busbar (2') is an open cage-shaped busbar (2'), and the clamping spring (3'), by means of the retaining leg (31) thereof, is at least held or even fastened against the first cage wall (21') from an exterior by pressing, stamping, riveting, screwing, clamping, adhesively bonding and/or latching.

* * * * *